Patented Mar. 27, 1951

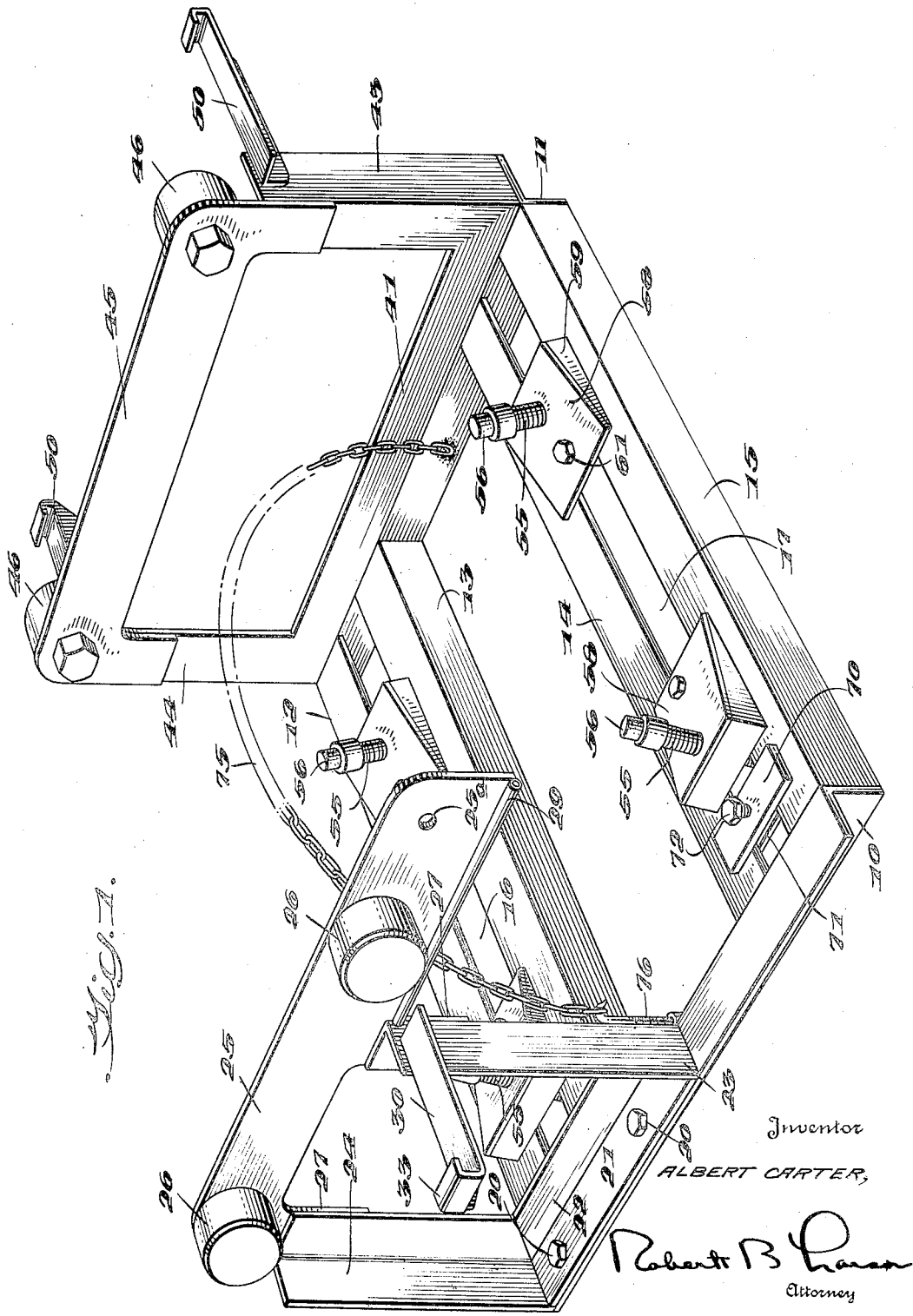

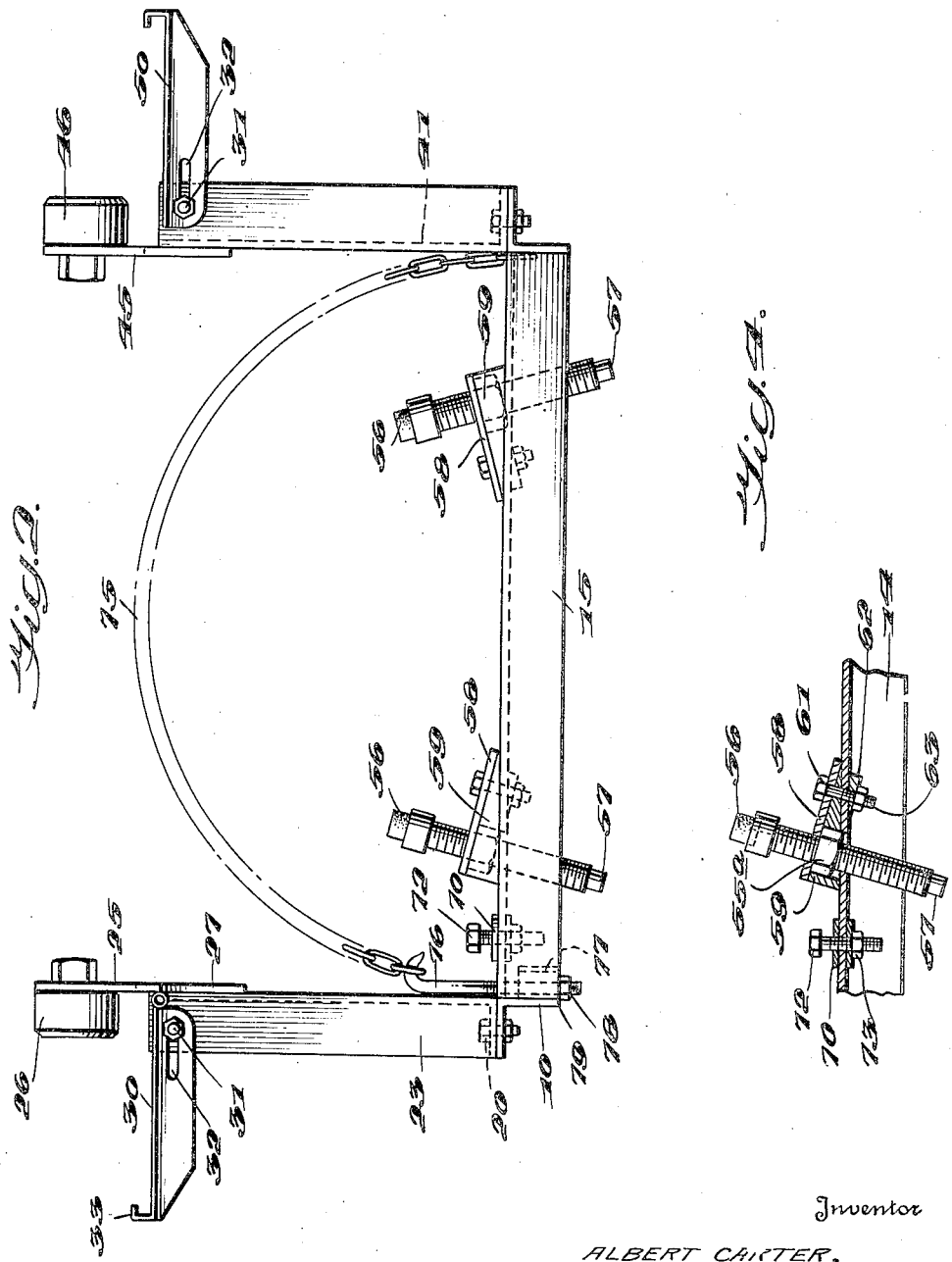

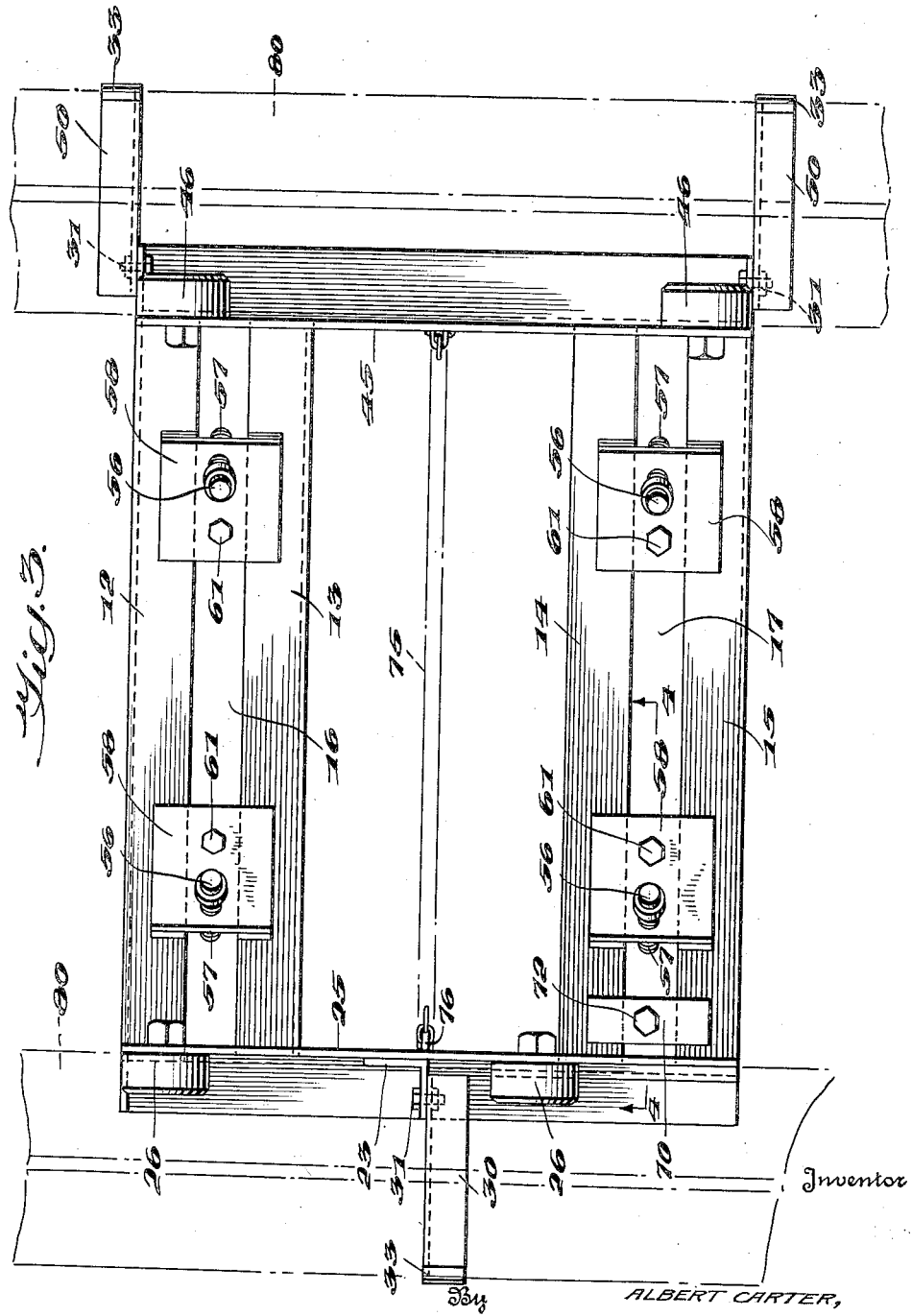

2,546,722

UNITED STATES PATENT OFFICE 2,546,722

MACHINERY SUPPORT

Albert Carter, Port Carbon, Pa.

Application August 13, 1946, Serial No. 690,279

8 Claims. (Cl. 248—3)

This invention relates to machinery supports, and more particularly to a device for supporting portions of vehicle propulsion mechanisms.

The repair of large vehicles such as automobile trucks is often a time consuming job requiring at least two men when it is necessary to disconnect heavy machine parts from their supports. For example, when changing or repairing a clutch, it is often necessary to remove the transmission which is positioned underneath the vehicle. At other times, it is necessary to remove the motor of the vehicle for repairs or replacement, in which case the transmission must ordinarily be removed inasmuch as it is supported by the motor. In other cases, for example, after an accident, the rear motor supports and the clutch housing may be found to be broken and to require replacement. Ordinarily, this would require the lowering of the transmission out of the frame and/or the removal of the motor.

All of the above examples ordinarily require considerable time and the use of a hoist or chain block, thereby necessitating the presence of one man to operate the hoist while another man directs the operation from beneath the vehicle and removes or secures the necessary parts depending upon the step which is being carried out.

In order to eliminate the necessity for a hoist when repairs of the above type are necessary, and to speed up and diminish the labor necessary in performing such operations, I have provided a novel support which is adapted to be carried by the frame of the vehicle so as to support portions of the machinery, such as the transmission, in a desired position. I also provide the supporting device with wheels which roll along the vehicle frame members to permit rolling the supported machinery part along the framework away from its normal position and out of the way, and then rolling the part back to its normal position when it is desired to reattach the part to the machinery.

A primary object of my invention is to provide a machinery support which will speed up the repair and/or replacement of machinery.

Another object of the invention is to provide a machinery support for use with vehicles such as trucks, and which is adapted to be carried by the frame members of the vehicle so as to support portions of the machinery of the vehicle during repair or replacement of parts.

Another object of the invention is to provide a support adapted to run along the frame members of the vehicle so as to support portions of the machinery of the vehicle while still permitting the movement of the machinery portions to and from their normal positions.

These and other objects of the invention will be apparent from the following specification and the accompanying drawings, in which:

Fig. 1 is a perspective view of a preferred embodiment of my novel machinery support;

Fig. 2 is a front elevational view of the device shown in Fig. 1;

Fig. 3 is a top plan view of the device; and

Fig. 4 is a detail cross-sectional view taken on line 4—4 of Fig. 3.

In the preferred embodiment of the invention shown in the drawings, the device, which I shall call a "Carter," has a framework comprising a pair of spaced longitudinal steel angle members 10 and 11 which are connected by means of four transverse angle members 12, 13, 14, and 15 joined at their ends to the longitudinal members 10 and 11 by suitable means such as welding. The transverse frame members are positioned in pairs at the front and rear end portions of the longitudinal frame members 10 and 11, the transverse members of each pair being spaced a short distance from each other to provide trackways 16 and 17 for a purpose which will be described presently.

To the rear end portion of the longitudinal frame 10, there is attached by bolts 20 and by welding, if desired, a shorter angle member 21 with its upstanding portion 22 extending upwardly from the inner edge of frame member 10 and cut off at each end at approximately a 45° angle. Front and rear upright angle members 23 and 24 are cut off at their lower ends at approximately a 45° angle so as to extend substantially vertically upwardly when joined to the ends of member 21 by welding. A flat sheet iron roller supporting member 25 carries a pair of rollers 26 on its outer surface and has downwardly extending arms 27 by which it is attached by suitable means such as welding to the upstanding angle members 23 and 24. A small iron pipe 29 may be welded to the lower edge of the forward portion of roller supporting member 25 to provide an additional brace for this portion of the member. A hole 25a is provided in the forward end portion of member 25 in case it is desired to mount the forward roller 26 in this position.

A safety catch 30 is mounted at its inner end to upright angle member 23 by means of a bolt 31 which rides in a slot 32 in the safety catch 30. The safety catch comprises an angle iron having its outer end bent back upon itself at 33 for a purpose which will be described presently.

Longitudinal frame member 11 carries an angle member 41 similar to angle member 21 except that the length of members 11 and 41 are approximately the same. Upright angle members 43 and 44 similar to members 23 and 24 are welded to the angularly cut ends of longitudinal member 41 and are welded at their upper ends to a flat member 45 which carries rollers 46. Each of the upright members 43 and 44 carries an outwardly extending safety catch 50 similar in construction and mounting to safety catch 30.

The machinery (not shown) which is supported by the "Carter" is engaged by four jacks two of which are mounted in each of the trackways 16 and 17 by means shown in detail in Fig. 4. Each jack comprises a threaded bolt 55 carrying a rubber cushion 56 at its upper end and cut square at its lower end 57 for engagement by a wrench (not shown). Each jack 55 is threaded into a nut 55a welded to the under side of a substantially square plate 58 considerably wider than trackways 16 and 17 and supported at an angle to its supporting transverse members 12 and 13 or 14 and 15 by means of a wedge-like member 59 welded to the under side of plate 58 and having an opening in which the nut 55a lies. A bolt 61 passes through the lower portion of each plate 58 and passes through a smaller complementary wedge 62 positioned on the under side of the horizontal portions of the transverse frame members supporting the jack. A nut 63 mounted on the lower end of each bolt 61 may be tightened to fix the jack with respect to the transverse frame members or may be loosened to permit adjustment of the jack along the transverse members to suit the machinery part to be supported. The two jacks riding in each of the trackways 16 and 17 are canted inwardly so as to be positioned at an acute angle with respect to each other.

It may be desirable in some cases to provide one or more small jacks as shown in detail in Fig. 4 to support protruding portions of the machine parts carried by the "Carter." Such small jacks preferably comprise merely a pair of narrow flat plates 70 and 71 positioned respectively above and below the horizontal portions of the transverse frame members and of sufficient length to bridge trackways 16 and 17. A threaded bolt 72 passes downwardly through a threaded opening in plate 70 and carries a nut 73 positioned below lower plate 71. By loosening nut 73, the small jack may be positioned as desired and then fixed in position by tightening nut 73.

A length of chain 75 is welded at one end to the inner surface of longitudinal frame member 11 and at its other end engages a hook 76 which passes through a housing 77 (Fig. 2) carried by the inner surface of longitudinal frame member 10. The lower end of the hook 76 is threaded and carries a nut 78 bearing against a washer 79 so as to tighten or loosen the chain after it is attached to hook 76.

In operation, the preferred form of the "Carter" shown in the drawings is intended for use with automobile trucks having longitudinal frame members comprising I beams 80 as shown in Fig. 3. When it is desired to repair the clutch of a truck, the "Carter" is positioned on the I beam longitudinal frame members of the truck with the rollers running on the inside channels of the frame members. Safety catches 30 and 50 are then adjusted by means of bolts 31 to position their bent end portions about the outer channels of the frame members so as to prevent accidental disengagement of the "Carter" from the frame members 80.

With the jacks 55 screwed down to their lowermost positions, the "Carter" is rolled along the longitudinal vehicle frame members to a position below the transmission, and the jacks 55 are rotated from below by means of a suitable wrench until they engage the transmission. The necessary disconnections for removing the transmission are then made after which the transmission, resting on the jacks 55 of the "Carter" is rolled rearwardly away from its normal position permitting access to the clutch of the vehicle. Chain 75 may be passed over the supported part, if desired, and tightened by means of threaded hook 76 and nut 78 in order to hold the parts securely in place on the "Carter."

After the repair of the clutch is completed, "Carter" may be rolled forwardly again to position the transmission directly beneath its normal position after which the chain may be removed from its holding position by loosening nut 78 and detaching chain 75 from hook 76. The transmission is then reattached to the vehicle and the job is completed. It is sometimes necessary to lower the transmission slightly by means of jacks 55 before it is rolled rearwardly from its normal position, in which case the transmission would be raised slightly by means of the jacks before being reattached to the vehicle.

In this way a job that previously took four to six hours with two men can now be done in one and one-half hours with a minimum of physical exertion on the part of the mechanics. It is also possible for one man working alone to change a clutch in two to three hours.

Another valuable use for the "Carter" is in the case where it is necessary to remove the entire motor of the vehicle for repairs or replacement. Ordinarily, this would entail removal of the transmission housing from below due to the fact that with the motor removed, there would be no support for the transmission and it would be impossible to hoist the transmission out of the vehicle with the motor. In such a case, the "Carter" is rolled along the vehicle frame members to a position below the transmission after which the transmission is removed and is left resting on the "Carter." The motor may then be removed from above for the necessary work thereon. After the completion of the work, the motor is returned to its position in the vehicle from above and is reattached to the transmission which remains supported by the "Carter" throughout the operation in its normal position with relation to the rest of the vehicle.

In another actual instance, the rear motor support and the clutch housing of a truck were found to be broken and in need of replacement after an accident. The "Carter" was utilized in this case to support the transmission while these parts were being replaced, thereby saving considerable time and eliminating the need for a hoist or chain block.

The preferred embodiment of the "Carter" shown in the drawings was constructed for use with a truck having a power take-off extending from the transmission, and the open space between the forward end of roller supporting plate 25 and longitudinal frame member 10 was provided to clear the power takeoff so that the "Carter" can roll completely under the transmission without being stopped by the projecting power takeoff. In this case, the small jack 72 is used to support the power takeoff on the transmission, although such support may not be absolutely necessary in some cases.

It is obvious that the "Carter" which I have described will find considerable utility other than the particular instances of use which I have mentioned, and it is also believed apparent that the "Carter" is susceptible of numerous variations without departing from the spirit of the invention. I wish it to be understood that I do not intend to be limited to the embodiment shown and described herein, but intend to cover by my patent all modifications of the invention falling within the scope of the appended claims.

I claim:

1. A device for supporting machinery normally carried by spaced frame members, comprising a pair of spaced upright side support members, transverse members fixed to the lower portions of said side support members and spaced from each other to provide trackways, at least one jack movably mounted in said trackways, and rollers mounted on the upper portions of said side members and engageable with side surfaces of said spaced frame members to suspend said device from said spaced frame members for movement along said frame members.

2. A device as set forth in claim 1, and transversely extending members carried by the upper end portions of said side support members for securing said device against unintended release from said spaced frame members.

3. A device for supporting portions of the machinery of automobile trucks having spaced longitudinally extending I beam frame members, comprising longitudinal lower framework members, two pairs of spaced transverse framework members joining said longitudinal framework members, said spaced transverse members forming trackways, a plurality of pairs of plates spaced above and below said transverse members, a screw holding each pair of plates together and operable to clamp said plates fixed with respect to said transverse members, a jack extending through each of said upper plates and threadedly supported by said plates, upright side members mounted on the upper surfaces of said longitudinal framework members, upper longitudinal framework members fixed to said upright members, a pair of rollers mounted on each of said upper longitudinal framework members, said rollers being constructed and arranged to ride on the inside channels of said I beam frame members, and safety brackets connected to said upright members by bolt and slot connections and having inwardly bent end portions for engaging the outer edges of said I beam frame members to secure the device against unintended release from said frame members.

4. A device as set forth in claim 3 in which two of said upright side members are provided on each side, the upright members on one side of the device being spaced from one end of the device to provide clearance for projecting parts of said machinery, and a smaller jack mounted in one of said trackways for supporting said parts.

5. A device for supporting machinery normally carried by spaced vehicle frame members, comprising a supporting framework including spaced, transversely extending elements, machinery engaging jack means mounted on said transversely extending elements and adjustable in height relative to said elements, and means for movably suspending said framework from said spaced frame members in a position below the machinery to be supported.

6. A device for supporting machinery normally carried by spaced vehicle frame members, comprising a supporting framework including spaced, transversely extending elements, at least one machinery engaging member mounted on said transversely extending elements, and rotatable means carried by said framework and engageable with said spaced frame members for movably suspending said framework from said frame members.

7. A device for supporting machinery normally carried by spaced vehicle frame members each having a flat surface, comprising a supporting framework, at least one machinery engaging member mounted on said framework and adjustable in height relative to said framework, rotatable means carried by said framework for engaging one edge portion of the flat surfaces of said spaced frame members, and bracket means carried by said framework and engageable with other edges of the flat surface of said frame members for securing said framework against unintended release from said spaced frame members.

8. A device as set forth in claim 7, and fastening means carried by said framework for passing over the supported machinery to secure the machinery to said device.

ALBERT CARTER.

REFERENCES CITED

The following references are of record in the file of this patent:

UNITED STATES PATENTS

| Number | Name | Date |
|---|---|---|
| 1,358,260 | Steinmetz | Nov. 9, 1920 |
| 2,327,446 | Ortgies | Aug. 24, 1943 |